April 21, 1959
A. J. ROUBAL
2,883,218
SEVERABLE HEAD NUT FOR GYRATORY CRUSHER
Filed April 22, 1954
2 Sheets-Sheet 1
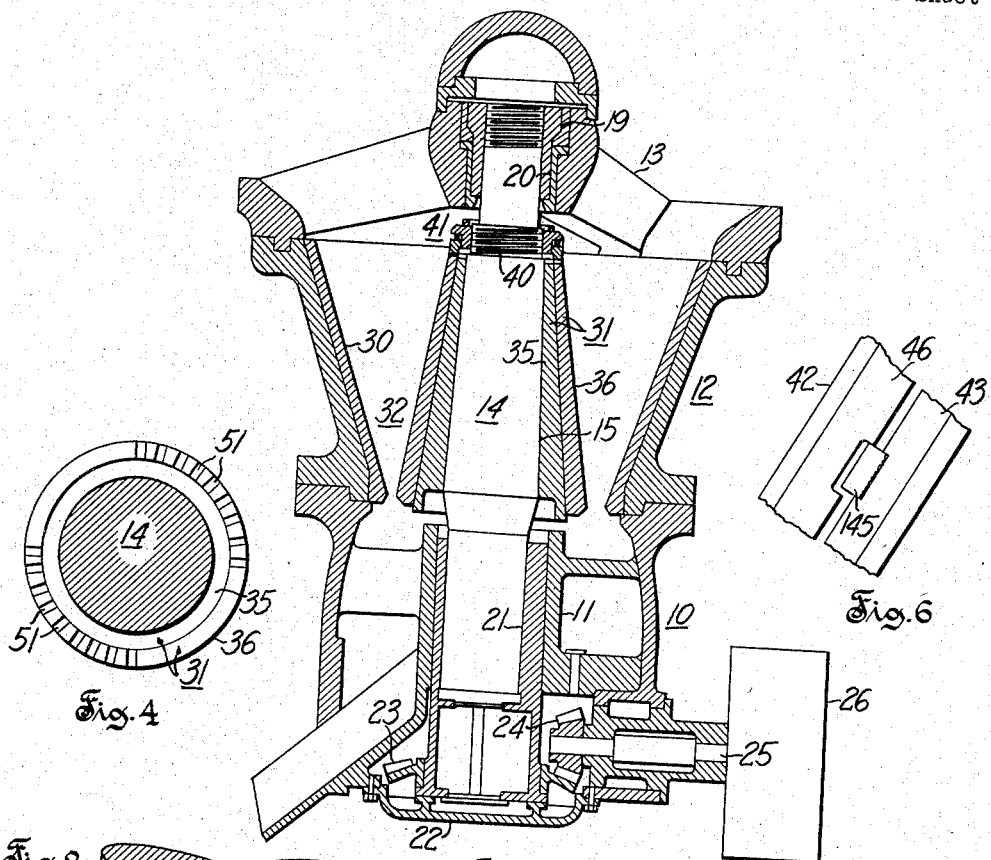
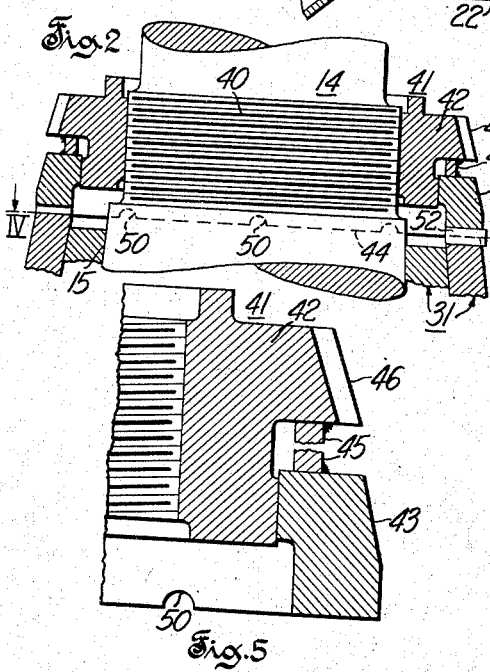
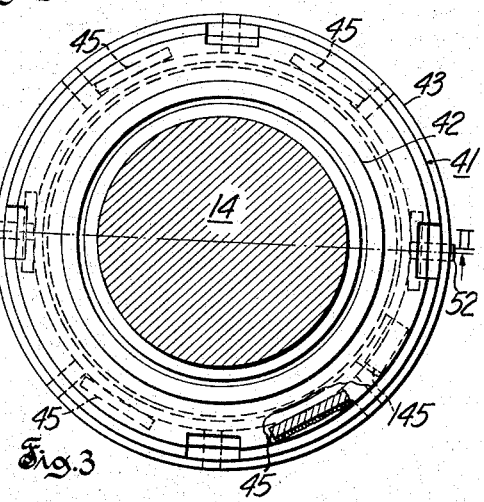
Inventor
Alexander J. Roubal
by Wayne B. Easton
Attorney April 21, 1959           A. J. ROUBAL           2,883,218
SEVERABLE HEAD NUT FOR GYRATORY CRUSHER
Filed April 22, 1954           2 Sheets-Sheet 2

Inventor
Alexander J. Roubal
by Wayne C. Easton
Attorney

United States Patent Office 2,883,218
Patented Apr. 21, 1959

2,883,218

SEVERABLE HEAD NUT FOR GYRATORY CRUSHER

Alexander J. Roubal, Milwaukee, Wis., assignor to Allis-Chalmers Manufacturing Company, Milwaukee, Wis.

Application April 22, 1954, Serial No. 424,842

10 Claims. (Cl. 287—52.01)

This invention relates to gyratory crushers and relates particularly to an improvement in head nuts of the self-tightening type for securing the head of the crusher to the main shaft of the crusher.

In gyratory crushers the main shaft thereof is provided with a tapered portion for receiving the crusher head. A threaded section on the shaft above the tapered portion is provided for receiving a head nut for forcing the head downwardly onto the tapered portion of the shaft. When the crusher is assembled at the factory or in the field, the head nut is forcibly tightened against the top of the head and suitable pinning means for keying the head nut to the head are provided for preventing relative rotational movement between the head nut and the head.

When the crusher is put into operation, the large forces involved in crushing stone or the like causes a differential rotational movement between the shaft and head. As the pinning means between the head nut and the head prevents relative rotational movement therebetween, the head nut on the threaded section of the shaft is also caused to rotate relative to the shaft. The rotational movement of the head nut relative to the shaft causes a large force to be transmitted in a downward direction from the head nut so as to forcibly wedge the head onto the tapered portion of the shaft. This force also causes the bottom surface of the head nut to be pressed tightly against the top surface of the head such that the frictional force therebetween is quite large.

This frictional force between the head nut and the head would itself make it quite difficult to loosen the head nut by turning. There is another factor, however, which contributes to the difficulty of loosening the head nut when it is desired to remove it. During operation of the crusher the crushing surface of the head is subjected to a hammering action by repeated impact of the rock or other material being crushed. This hammering action causes the working surface of the head to be peened such that the surface layer tends to expand by cold working. The expansion of the surface metal of the head at the junction of the head and head nut tremendously increases the frictional force therebetween and the originally flat surface of the top of the head actually becomes dish shaped. The effect of this tremendous frictional force is that it is impossible to loosen the head nut by turning it without deforming and tearing the contacting surfaces of the head and head nut.

Due to this tremendous frictional force it is therefore not practical to loosen by turning and when it is desired to remove the head, the head nut must be cut from the threaded section of the shaft as with a cutting torch or other means. The necessity for removing the head nut in this manner has the disadvantages that (1) the head nut is thereby damaged beyond repair and cannot be used again, (2) the threaded section of the shaft is easily damaged such that repair thereto is required or the shaft may be damaged beyond repair, and (3) the cost of the labor for removing the head nut is expensive.

In accordance with the present invention an improved head nut is provided which has two main portions, one internally threaded portion being adapted to be screwed on the threaded section of the crusher shaft and the other portion, which may comprise several parts, is adapted to bear on the top of the crusher head. The two portions may be disconnected as by cutting with a cutting torch so that when it is desired to remove the head nut, the threaded portion of the head nut may be easily unscrewed from the shaft and the portion of the head nut which bears on the head may be lifted vertically therefrom as with a prying tool. The difficulties involved in removing prior art head nuts from shafts is thereby avoided.

The main objects of the invention, therefore, are to provide a new and improved head nut for gyratory crushers which can be loosened and unthreaded from the crusher shaft (1) without damaging the head nut beyond repair, (2) without causing damage to the threaded section of the crusher shaft, and (3) with a minimum of labor expense.

Another object of the invention is to provide a new and improved head nut for gyratory crushers which can be loosened without turning it relative to the crusher head or the crusher shaft.

Other objects and advantages will appear from a detailed description of the invention, four embodiments of which are described below and illustrated in the accompanying drawings.

In the drawings:

Fig. 1 is a sectional elevation of a gyratory crusher equipped with a head nut constructed in accordance with the present invention;

Fig. 2 is an enlarged fragmentary sectional view corresponding to a portion of Fig. 1 showing the details of the crusher head nut and is taken on line II—II of Fig. 3;

Fig. 3 is a plan view of the head nut shown in Fig. 2;

Fig. 4 is a reduced sectional view taken on line IV—IV of Fig. 2 and shows the upper surface of the crusher head;

Fig. 5 is an enlarged fragmentary sectional view corresponding to the views of the head nut shown in Figs. 1 and 2 except that the head nut is shown as it appears after a portion or portions have been cut away with a cutting torch or a saw;

Fig. 6 is a fragmentary end view of the head nut shown in Fig. 3 and shows key 145;

Figures 7, 8:
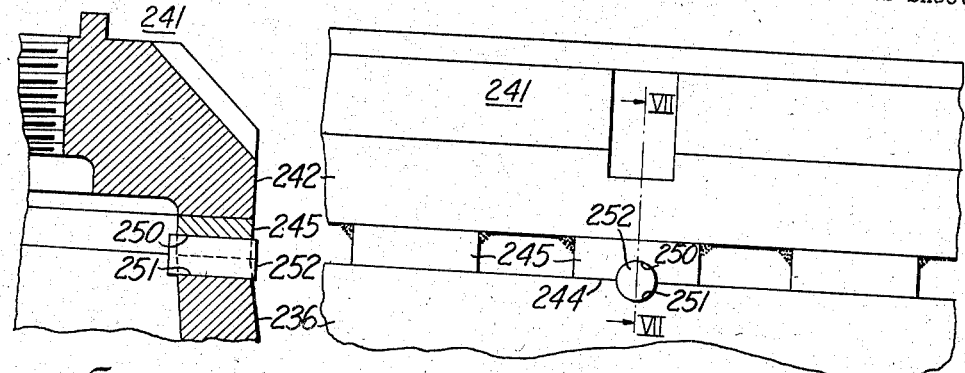
Fig. 7 is a fragmentary sectional view taken on line VII—VII of Fig. 8 and shows a modification of the head nut.
Fig. 8 is a fragmentary elevational view of the head nut shown in Fig. 7.

Referring to Fig. 1 of the drawing, there is shown a gyratory crusher of a type known to the art comprising a lower frame 10 provided with a hub portion 11, an upper frame 12 forming the outer shell of the crusher chamber, a spider 13 mounted on upper frame 12, and a centrally located gyratable shaft 14 having the usual tapered portion 15. Shaft 14 is suspended at the upper end thereof by a suspension device 19 mounted in spider 13 and is rotatably fulcrumed in a universal type bearing 20 mounted in spider 13. Shaft 14 is gyrated at its lower end by an actuating eccentric sleeve 21 in which the lower end of shaft 14 is rotatably journaled. Eccentric sleeve 21 has a cylindrical external surface journaled in the hub portion 11 of lower frame 10 and the internal bore of sleeve 21 is eccentric to and has its axis inclined relative to the external surface of sleeve 21. Eccentric sleeve 21 is rotatably supported by a supporting bearing 22 on lower frame 10 and carries a ring gear 23 which is driven by a driving pinion 24. Pinion 24 is mounted on a horizontally disposed shaft 25 which is rotatably mounted in the lower frame 10 and equipped with a driven actuating pulley 26 or the like.

Secured within upper frame 12 is an outer crusher member or concave 30. An inner frusto-conical crusher member or head 31 is secured to shaft 14 and is spaced from concave 30 to form a crushing chamber 32 therebetween. Head 31 as illustrated herein comprises a head center 35 adapted to fit the tapered portion 15 of shaft 14 and a head mantle 36 adapted to be fitted on head center 35. The head 31 may consist of only one part, however, as it often is in practice. The term "head" as used in the appended claims is intended to cover any type of crusher head which is fitted on the tapered portion of the main shaft 14 regardless of whether the head comprises only one or a plurality of parts.

The foregoing is typical of most gyratory crushers and the improved head nut to which the present invention is directed will now be explained.

Referring to Fig. 1 and specifically to Figs. 2 and 3, a threaded section 40 is provided on shaft 14 above the tapered portion 15 for receiving a head nut 41. Head nut 41 functions to secure head 31 to the tapered portion 15 of shaft 14. Head nut 41 is constructed in accordance with the present invention with an annularly shaped portion 42 which is internally threaded for engagement with the threaded section 40 of shaft 14, a ring shaped portion 43 coaxially positioned relative to threaded element 42 and having a lower surface 44 adapted to engage the upper surface of crusher head 31, and connecting means for connecting threaded portion 42 and ring portion 43 together to form head nut 41 which are illustrated herein as a plurality of bar shaped pieces 45 disposed and secured as by welding between threaded portion 42 and ring portion 43. Threaded portion 42 is provided on the upper part thereof with an annular flange 46. Ring portion 43 surrounds the lower part of threaded portion 42 in coaxial, axially spaced relation to flange 46 such that ring portion 43 is axially movable relative to threaded portion 42 prior to the installation of bar shaped pieces 45. Bar shaped pieces 45 are disposed between ring portion 43 and flange 46 and welded in position to complete the construction of head nut 41. As a precautionary measure to reduce the forces transmitted to the welds for bars 45, radial slots may be provided in threaded portion 42 and flange 46 to accommodate an oversized bar shaped piece 145 which is welded to ring portion 43 and abuts a vertical surface of the slot in flange 46.

Ring portion 43 has a plurality of semicircular recesses 50 formed in lower surface 44; and, as shown in Fig. 4, the upper surface of the head mantle 36 of the head 31 is provided with a plurality of semicircular recesses 51. Upon tightening head nut 41, pins 52 may be inserted to key head nut 41 to the crusher head 31 to prevent relative rotation therebetween. This method of keying the head nut to the crusher head is old but is referred to so that the differential movement between the head 31 and shaft 14 explained in the introduction of this specification may be better understood.

When shaft 14 is caused to gyrate, the material such as stone or the like being crushed in crushing chamber 32 exerts forces on head 31 in a direction opposite the direction of gyration such that head 31 and head nut 41 are rotated relative to shaft 14. This rotation of head nut 41 relative to the threaded section 40 of shaft 14 causes a large force to be transmitted in a downward direction from head nut 41 so as to increase the initial wedging force between head 31 and the tapered portion 15 of shaft 14. The force with which the bottom surface of head nut 41, which is usually made of cast steel, and the top surface of head mantle 36 are pressed together causes the frictional force therebetween to be large.

As stated in the introduction of this specification, however, there is a contributing factor which makes it impractical to loosen the head nut by turning. This factor is the cold working of the head at the junction of the head nut and head caused by the impacting of the material being crushed. The resulting frictional force between the head and head nut becomes so great that the head nut cannot be loosened by turning and, with prior art head nut constructions, it is necessary to physically destroy the head nut as with a cutting torch to remove it from the crusher shaft.

In Fig. 5 it is illustrated how expediently the head nut 41 described and claimed herein can be removed from a crusher shaft. When it is desired to remove head nut 41 from shaft 14, cutting means such as a cutting torch or a saw are utilized to cut through bars 45 and bar 145 so as to disconnect ring portion 43 from threaded portion 42. Ring portion 43 is thereby made axially movable relative to threaded portion 42 and may be lifted vertically from the head 31 as with a prying tool and need not be rotated relative to head 31. Threaded portion 42 may then be easily unscrewed from the threaded section 40 of shaft 14 because the vertical tightening forces transmitted to threaded portion 42 through bars 45 are eliminated when the bars are cut.

Referring to Fig. 3, head nut 41 may easily be reconditioned by welding a new set of bars 45 in the circumferential spaces between the bars which were cut. An alternative procedure would be to machine the lower surface on flange 46 and the upper surface on ring portion 43 to remove the remaining portions of bars 45 and bar 145 which have been cut and install a new set of bars in the same positions shown in Fig. 3.

A second embodiment of a head nut constructed in accordance with the invention is shown in Figs. 7 and 8. The head nut 241 there shown comprises an annularly shaped portion 242 which is internally threaded for engagement with the threaded section of a gyratory crusher shaft and means positioned coaxially relative to internally threaded portion 242 which comprises downwardly extending, circumferentially spaced lugs 245 joined thereto as by welding which are adapted to engage the upper surface of a gyratory crusher head. One or more of the lugs 245 is provided with a semicircular recess 250 formed in the lower surface 244 thereof which aligns with a similarly shaped recess 251 in the upper surface of a gyratory crusher head mantle 236 so that a pin 252 may be inserted to prevent relative rotation therebetween. Lugs 245 are susceptible of being severed as by cutting to relieve the axial pressure transmitted therethrough and thereby permit internally threaded portion 242 to be easily unscrewed from the threaded section of the crusher shaft. Head nut 241 may then be reconditioned by welding a new set of bars or lugs in the space between the lugs 245 which were cut. An alternative procedure would be to machine the lower surface of internally threaded portion 242 to remove the remaining portions of lugs 245 which have been cut and install a new set of lugs in the same positions shown in Fig. 8.

Figures 9, 10:
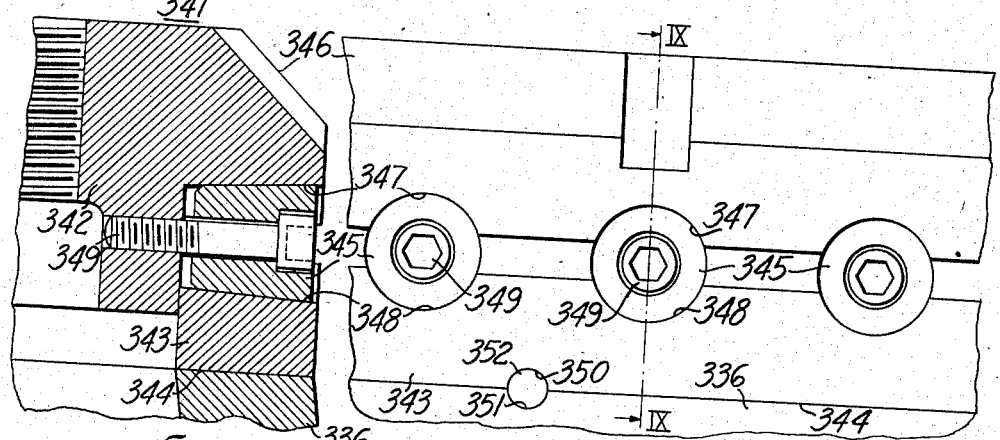
Fig. 9 is a fragmentary sectional view taken on line IX—IX of Fig. 10 and shows a second modification of the head nut.
Fig. 10 is a fragmentary elevational view of the head nut shown in Fig 9.

A third head nut embodying the invention is shown in Figs. 9 and 10. The head nut 341 there shown comprises an annularly shaped portion 342 which is internally threaded for engagement with the threaded section of a gyratory crusher shaft and a ring shaped portion 343 coaxially positioned relative to threaded portion 342 and having a lower surface 344 adapted to engage the upper surface of a gyratory crusher head. A keying arrangement for preventing relative rotation between ring portion 343 and head mantle 336 comprises semicircular recesses 350 formed in the lower surface 344 of ring portion 343 which aligns with a semicircular recess 351 in the upper surface of head mantle 336 so that a pin 352 may be inserted. Internally threaded portion 342 is provided with a flange 346 which has a plurality of radially extending, circumferentially spaced recesses 347 formed in the lower surface thereof. Ring portion 343, which surrounds the lower portion of threaded portion 342 in axially spaced relation to flange 346, has a corresponding plurality of similarly arranged recesses 348 in the upper surface thereof. The recesses 347 in flange 346 are axially aligned respectively with recesses 348 in ring portion 343 and bushings 345, which may have tapered external surfaces, are respectively disposed between axially aligned pairs of recesses and are connected by screws 349 to threaded portion 342. Bushings 345 prevent relative axial and rotational movement between threaded portion 342 and ring portion 343. Bushings 345 are susceptible of being at least partially removable or severed as by cutting to relieve the axial pressure transmitted therethrough and thereby permit threaded portion 342 to be easily unscrewed from the threaded section of a crusher shaft. Head nut 341 may then be reconditioned by simply installing a new set of bushings 345.

Figures 11, 12:
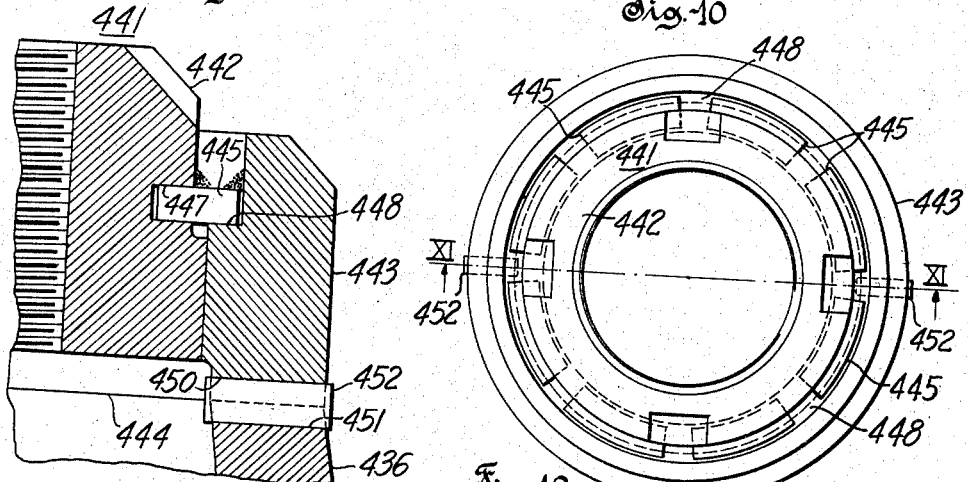
Fig. 11 is a fragmentary sectional view taken on line XI—XI of Fig. 12 and shows a third modification of the head nut.
Fig. 12 is a plan view of the head nut shown in Fig. 11.

A fourth head nut embodying the invention is shown in Figs. 11 and 12. The head nut 441 there shown comprises an annularly shaped portion 442 which is internally threaded for engagement with the threaded section of a gyratory crusher shaft and a ring shaped portion 443 coaxially positioned relative to threaded portion 442 in surrounding relation thereto and adapted to engage the upper surface of a gyratory crusher head. A keying arrangement for preventing relative rotation between ring portion 443 and head mantle 436 comprises semi-circular recesses 450 formed in the lower surface 444 of ring portion 443 which aligns with a semicircular recess 451 in the upper surface of head mantle 436 so that a pin 452 may be inserted. Threaded portion 442 is provided with a circumferentially extending recess 447 in the outer surface thereof in which are disposed a plurality of arcuate shaped bars 445 which extend radially therefrom. Ring portion 443 has a counterbore formed in the upper part thereof such that an annularly shaped, upwardly facing abutment 448 is formed which contacts the radially extending portions of bars 445. Bars 445 are welded to threaded portion 442 and ring portion 443 to prevent relative axial and rotational movement therebetween. Bars 445 are susceptible of being at least partially removable or severed as by cutting to relieve the axial pressure transmitted therethrough to threaded portion 442 and thereby permit threaded portion 442 to be easily unscrewed from the threaded section of a crusher shaft. Head nut 441 may then be reconditioned by removing the remaining portions of bars 445 which have been cut and installing a new set of bars 445.

In accordance with the invention it is a characteristic of each of the four head nuts disclosed herein that portions of each head nut which transmit axial pressure from the head of the crusher to the annularly shaped, internally threaded portion of the head nut are susceptible of being at least partially removable as by cutting or by other means. This has the effect of relieving the axial pressure transmitted to the threaded portion of the head nut and thereby permits the threaded portion of the head nut to be easily unscrewed from the threaded section of a crusher shaft.

As will be obvious to a person skilled in the art, there are a variety of ways that head nut illustrated herein, may be constructed to accomplish the objects of the invention. It will thus be understood that the scope of the present invention is not limited to the precise details of the head nut described and illustrated but that, within the scope of the appended claims, the head nut may be modified by such equivalents as may readily occur to persons skilled in the art to which the invention pertains.

It is claimed and desired to secure by Letters Patent:

1. A head nut for a gyratory crusher of the type having a shaft with a tapered portion and a threaded section above the tapered portion and having a crusher head with a tapered internal bore forcibly engaging the tapered portion of the shaft, comprising, an annularly shaped portion internally threaded for engagement with the threaded section of the gyratory crusher shaft, a severable connecting structure secured to said internally threaded portion and positioned coaxially relative to said internally threaded portion and having a lower surface adapted to engage the upper surface of the gyratory crusher head, said structure including severable detent means extending upwardly into engagement with said annular shaped portion to prevent relative axial and rotational movement therebetween while said severable detent means remain in nonsevered condition; a removable key operatively interposed in interlocking relationship between said lower surface of said structure and said upper surface of said crusher head, said annularly shaped portion becoming movable relative to said interlocked connecting structure and crusher head upon severance of said severable detent means to permit the internally threaded portion to be unscrewed from the crusher shaft.

2. A head nut for a gyratory crusher of the type having a shaft with a tapered portion and a threaded section above the tapered portion and having a crusher head with a tapered internal bore forcibly engaging the tapered portion of the shaft, comprising, an annularly shaped portion internally threaded for engagement with the threaded section of a gyratory crusher shaft, a ring shaped portion positioned coaxially relative to said internally threaded portion and having a lower surface adapted to engage the upper surface of a gyratory crusher head, said ring portion being formed so as to be axially movable relative to said internally threaded portion, a removable key interposed between said ring shaped portion and said upper surface of said crusher head, and at least one severable connecting member secured between said internally threaded portion and said ring portion to prevent relative axial and rotational movement therebetween, said member being at least partially removable as by cutting to permit axial movement of said ring portion relative to said internally threaded portion.

3. A head nut for a gyratory crusher, comprising, an annularly shaped portion internally threaded for engagement with the threaded section of a gyratory crusher shaft, a ring shaped portion positioned coaxially relative to said internally threaded portion and having at least a part thereof extending below said internally threaded portion and having a lower surface adapted to engage the upper surface of a gyratory crusher head, said ring portion being formed so as to be axially movable relative to said internally threaded portion, a removable key interposed between said ring shaped portion and said upper surface of said gyratory crusher head, and a member welded between said internally threaded portion and said ring portion to prevent relative axial and rotational movement therebetween, said member being severable as by cutting to permit axial movement of said ring portion relative to said internally threaded portion.

4. A head nut for a gyratory crusher, comprising, an annularly shaped portion internally threaded for engagement with the threaded section of a gyratory crusher shaft, a ring shaped portion positioned coaxially relative to said internally threaded portion having at least a part thereof extending below said internally threaded portion and having a lower surface adapted to engage the upper surface of a gyratory crusher head, said ring portion being formed so as to be axially movable relative to said internally threaded portion, a removable key interposed between said ring shaped portion and said upper surface of said gyratory crusher head, and at least one detachable connecting member secured between said internally threaded portion and said ring portion to prevent relative axial and rotational movement therebetween.

5. A head nut for a gyratory crusher, comprising, an annularly shaped portion internally threaded for engagement with the threaded section of a gyratory crusher shaft, a ring shaped portion surrounding said internally threaded portion in axially movable relation thereto and having the bottom surface thereof adapted to engage the upper surface of a gyratory crusher head, said ring shaped portion having severable detent means extending upwardly therefrom into engagement with said internally threaded portion to prevent relative movement therebetween; and a removable key interposed between in interlocking relationship with said bottom surface of said ring shaped portion and said upper surface of said gyratory crusher head to prevent relative movement therebetween.

6. A head nut for a gyratory crusher of the type having a shaft with a tapered portion and a threaded section above the tapered portion and having a crusher head with a tapered internal bore forcibly engaging the tapered portion of the shaft, comprising, an annularly shaped portion internally threaded for engagement with the threaded section of a gyratory crusher shaft, a ring shaped portion surrounding said internally threaded portion in axially movable relation thereto and having at least a part thereof extending below said internally threaded portion and having a lower surface adapted to engage the upper surface of a gyratory crusher head, a removable key interposed between said ring shaped portion and said upper surface of said gyratory crusher head, and at least one severable member welded between said internally threaded portion and said ring portion to prevent relative axial and rotational movement therebetween.

7. A head nut for a gyratory crusher, comprising, an annularly shaped portion internally threaded for engagement with the threaded section of a gyratory crusher shaft and having a flange on the upper part thereof, a ring shaped portion surrounding the lower part of said internally threaded portion in axially spaced relation to said flange and having the bottom surface thereof adapted to engage the upper surface of a gyratory crusher head, a removable key interposed between said ring shaped portion and said upper surface of said gyratory crusher head and a plurality of generally bar shaped pieces welded between said ring portion and said flange to prevent relative axial and rotational movement between said ring portion and said internally threaded portion, each of said bar shaped pieces being partially removable as by cutting to permit axial movement of said ring portion relative to said internally threaded portion.

8. A head nut for a gyratory crusher, comprising, an annularly shaped portion internally threaded for engagement with the threaded section of a gyratory crusher shaft, means positioned coaxially relative to said internally threaded portion which comprises downwardly extending, circumferentially spaced severable lugs which are adapted to engage the upper surface of a gyratory crusher head, said internally threaded portion and said lugs being joined to prevent relative axial and rotational movement therebetween, a removable key interposed between at least one of said lugs and said upper surface of said crusher head.

9. A head nut for a gyratory crusher, comprising, an annularly shaped portion internally threaded for engagement with the threaded section for a gyratory crusher shaft and having a flange on the upper part thereof and a plurality of circumferentially spaced radially extending recesses formed in the lower surface thereof, a ring shaped portion surrounding the lower part of said threaded portion in axially spaced relation to said flange and having a corresponding plurality of similarly arranged recesses formed in the upper surface thereof, said ring portion having a bottom surface adapted to engage the upper surface of a gyratory crusher head, a plurality of cylindrically shaped bushings respectively removably disposed between axially aligned recesses of said ring portion and said flange and connected by screws to said internally threaded portion to prevent relative axial and rotational movement between said ring portion and said internally threaded portion, and a removable key interposed between said ring shaped portion and said upper surface of said gyratory crusher head, each of said bushings being at least partially removable to permit axial movement of said ring member relative to said threaded element.

10. A head nut for a gyratory crusher, comprising, an annularly shaped portion having an inner and an outer surface, said inner surface being threaded for engagement with the threaded section of a gyratory crusher shaft and said outer surface having a circumferentially extending recess formed therein, a ring portion surrounding said internally threaded portion in axially movable relation thereto and having a lower surface adapted to engage the upper surface of a gyratory crusher head said ring portion being counterbored in the upper part thereof to form an upwardly facing abutment, and a plurality of arcuate shaped bars connecting said internally threaded portion and said ring portion to prevent relative axial movement therebetween, said bars being disposed in said recess in circumferentially spaced relation and extend radially therefrom and are weldingly connected to said internally threaded portion and to the abutment on said ring portion, and a removable key interposed between said ring portion and said upper surface of said gyratory crusher head, said bars being at least partially removable as by cutting to thereby permit relative axial movement between said internally threaded portion and said ring portion.

References Cited in the file of this patent

UNITED STATES PATENTS

| | | |
|---|---|---|
| 1,931,633 | Symons | Oct. 24, 1933 |
| 2,226,496 | Jacocks | Dec. 24, 1940 |
| 2,679,414 | Hornschuch | May 25, 1954 |
| 2,787,426 | Roubal | Apr. 2, 1957 |

FOREIGN PATENTS

| | | |
|---|---|---|
| 9,109 | Great Britain | of 1915 |
| 305,398 | Great Britain | of 1929 |
| 708,572 | Great Britain | May 5, 1954 |
| 1,035,692 | France | Apr. 22, 1953 |

UNITED STATES PATENT OFFICE

CERTIFICATE OF CORRECTION

Patent No. 2,883,218 April 21, 1959

Alexander J. Roubal

It is hereby certified that error appears in the printed specification of the above numbered patent requiring correction and that the said Letters Patent should read as corrected below.

Column 8, line 5, for "section for" read -- section of --.

Signed and sealed this 11th day of August 1959.

(SEAL)
Attest:

KARL H. AXLINE
Attesting Officer

ROBERT C. WATSON
Commissioner of Patents